US007256772B2

(12) United States Patent
Morrison (10) Patent No.: US 7,256,772 B2
(45) Date of Patent: Aug. 14, 2007

(54) AUTO-ALIGNING TOUCH SYSTEM AND METHOD

(75) Inventor: Gerald D. Morrison, Calgary (CA)

(73) Assignee: Smart Technologies, Inc. (CA)

( * ) Notice: Subject to any disclaimer, the term of this patent is extended or adjusted under 35 U.S.C. 154(b) by 261 days.

(21) Appl. No.: 10/408,785

(22) Filed: Apr. 8, 2003

(65) Prior Publication Data

US 2004/0201575 A1 Oct. 14, 2004

(51) Int. Cl.
*G09G 5/00* (2006.01)
(52) U.S. Cl. ............... 345/178; 345/175; 178/18.01
(58) Field of Classification Search ........ 345/173–175, 345/178; 178/18.01, 18.03; 341/5; D14/389
See application file for complete search history.

(56) References Cited

U.S. PATENT DOCUMENTS

| 4,144,449 A | 3/1979 | Funk et al. |
| 4,507,557 A | 3/1985 | Tsikos .................. 250/341 |
| 4,558,313 A | 12/1985 | Garwin |
| 4,742,221 A | 5/1988 | Sasaki et al. ............. 250/221 |
| 4,746,770 A | 5/1988 | McAvinney ............... 178/18 |
| 4,818,826 A | 4/1989 | Kimura ..................... 178/19 |
| 5,097,516 A | 3/1992 | Amir |
| 5,317,140 A | 5/1994 | Dunthorn ................... 250/221 |
| 5,483,261 A | 1/1996 | Yasutake |
| 5,502,568 A | 3/1996 | Ogawa et al. ............. 356/375 |
| 5,581,276 A | 12/1996 | Cipolla et al. |
| 5,638,092 A | 6/1997 | Eng et al. |
| 5,737,740 A | 4/1998 | Henderson et al. |
| 5,825,352 A | 10/1998 | Bisset et al. |

(Continued)

FOREIGN PATENT DOCUMENTS

CA 2493236 A1 12/2003

(Continued)

OTHER PUBLICATIONS

"CCDs in optical touch panels deliver high resolution", Bud K. Funk, Electronic Design, Sep. 27, 1980, pp. 139-143.

(Continued)

*Primary Examiner*—Amr A. Awad
*Assistant Examiner*—Tom Sheng
(74) *Attorney, Agent, or Firm*—Katten Muchin Rosenman LLP (57) ABSTRACT

A touch system includes a touch surface on which an image is, displayed and at least one camera acquiring images of the touch surface. A pointer contact data generator generates pointer position data in response to pointer contact with the touch surface. The pointer position data represents the location of the pointer on the touch surface where pointer contact is made. A processor communicates with the at least one camera and the pointer contact data generator. The processor uses known points in the displayed images to calibrate automatically co-ordinate systems of the touch system, and uses calibrated pointer position data to update image data that is used to present the displayed image on the touch surface. In one embodiment, the touch system includes an active touch sensitive screen that comprises both the touch surface and the pointer contact data generator. In another embodiment, image data generated by a pair of cameras having overlapping fields of view is used by the pointer contact data generator to generate the pointer position data when a pointer is acquired in images captured by the pair of cameras.

38 Claims, 4 Drawing Sheets

U.S. PATENT DOCUMENTS

| | | | |
|---|---|---|---|
| 5,936,615 A | 8/1999 | Waters | 345/173 |
| 5,963,199 A | 10/1999 | Kato et al. | |
| 5,982,352 A | 11/1999 | Pryor | |
| 6,008,798 A | 12/1999 | Mato, Jr. et al. | 345/168 |
| 6,100,538 A | 8/2000 | Ogawa | 250/559.38 |
| 6,161,066 A | 12/2000 | Wright et al. | |
| 6,208,330 B1 | 3/2001 | Hasegawa et al. | 345/173 |
| 6,256,033 B1 | 7/2001 | Nguyen | |
| 6,262,718 B1 * | 7/2001 | Findlay et al. | 345/178 |
| 6,310,610 B1 | 10/2001 | Beaton et al. | |
| 6,323,846 B1 | 11/2001 | Westerman | |
| 6,335,724 B1 | 1/2002 | Takekawa et al. | 345/173 |
| 6,339,748 B1 | 1/2002 | Hiramatsu | |
| 6,353,434 B1 * | 3/2002 | Akebi et al. | 345/173 |
| 6,359,612 B1 | 3/2002 | Peter et al. | |
| 6,414,671 B1 | 7/2002 | Gillespie et al. | 345/157 |
| 6,421,042 B1 | 7/2002 | Omura et al. | 345/157 |
| 6,429,856 B1 | 8/2002 | Omura et al. | |
| 6,507,339 B1 * | 1/2003 | Tanaka | 345/178 |
| 6,531,999 B1 | 3/2003 | Trajkovic | 345/157 |
| 6,563,491 B1 | 5/2003 | Omura | 345/173 |
| 6,594,023 B1 | 7/2003 | Omura et al. | |
| 6,608,619 B2 | 8/2003 | Omura et al. | |
| 6,674,424 B1 | 1/2004 | Fujioka | |
| 6,710,770 B2 | 3/2004 | Tomasi et al. | |
| 6,774,889 B1 * | 8/2004 | Zhang et al. | 345/173 |
| 6,803,906 B1 | 10/2004 | Morrison et al. | |
| 6,933,981 B1 | 8/2005 | Kishida et al. | |
| 7,007,236 B2 | 2/2006 | Dempski et al. | |
| 7,030,861 B1 | 4/2006 | Westerman et al. | |
| 2001/0019325 A1 | 9/2001 | Takekawa | 345/157 |
| 2001/0022579 A1 | 9/2001 | Hirabayashi | 345/175 |
| 2001/0026268 A1 | 10/2001 | Ito | 345/175 |
| 2001/0033274 A1 | 10/2001 | Ong | |
| 2002/0036617 A1 | 3/2002 | Pryor | |
| 2003/0001825 A1 | 1/2003 | Omura et al. | |
| 2003/0025951 A1 | 2/2003 | Pollard et al. | |
| 2003/0085871 A1 | 5/2003 | Ogawa | |
| 2004/0021633 A1 | 2/2004 | Rajkowski | |
| 2004/0178997 A1 | 9/2004 | Gillespie et al. | |
| 2004/0189720 A1 | 9/2004 | Wilson et al. | |
| 2005/0052427 A1 | 3/2005 | Wu et al. | |

FOREIGN PATENT DOCUMENTS

| | | |
|---|---|---|
| DE | 198 10 452 A1 | 12/1998 |
| JP | 57-211637 | 12/1982 |
| JP | 8-240407 | 9/1996 |
| JP | 9-91094 | 4/1997 |
| JP | 9-319501 | 12/1997 |
| WO | WO99/40562 | 8/1999 |
| WO | WO 02/03316 A1 | 1/2002 |
| WO | 02/03316 A1 | 2/2002 |
| WO | 2003/105074 A2 | 12/2003 |

OTHER PUBLICATIONS

International Search Report with a date of mailing of Oct. 22, 2001 for PCT/CA01/00980 with an international Filing Date of Jul. 5, 2001.

* cited by examiner

AUTO-ALIGNING TOUCH SYSTEM AND METHOD

FIELD OF THE INVENTION

The present invention relates generally to touch systems and in particular to an auto-aligning touch system and to a method of automatically aligning a touch system.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft or pointer misplacement are of no concern to users.

International PCT Application No. PCT/CA01/00980 filed on Jul. 5, 2001 and published under No. WO 02/03316 on Jan. 10, 2002, assigned to the assignee of the present invention, discloses a camera-based touch system comprising a touch screen that includes a touch surface on which a computer-generated image is presented. A rectangular bezel or frame surrounds the touch surface and supports digital cameras at its corners. The digital cameras have overlapping fields of view that encompass and look along the touch surface. The digital cameras acquire images from different locations and generate image data. The image data acquired by the cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of application programs executed by the computer.

In this passive camera-based touch system and in fact in all touch systems, the mechanism generating the image for display on the touch surface is distinct and separate from the mechanism that provides the touch capability. As a result, the co-ordinate system of the touch screen is different than the co-ordinate system of the image generator. In order for the touch system to maintain the desired high resolution, the touch system co-ordinate system must be properly mapped to the co-ordinate system of the image generator. This co-ordinate system mapping is typically performed through an alignment procedure requiring manual intervention.

For example, U.S. Pat. No. 5,448,263 to Martin, assigned to SMART Technologies, Inc., assignee of the present invention, discloses a passive touch system coupled to a computer that executes an alignment routine to enable the co-ordinate system of the touch screen to be mapped to the co-ordinate system of the computer display. During the alignment routine, reference marks at known computer display co-ordinates are displayed on the touch surface of the touch screen and the user is prompted to touch the reference marks with a pointer. In response to the pointer contacts, the touch screen outputs pointer position data representing the specific locations on the touch surface where the pointer contacts are made. The pointer position data output by the touch screen is conveyed to the computer. Since the display co-ordinates of the reference marks are known, the computer can use the pointer position data output by the touch screen to map the computer display co-ordinate system to the touch screen co-ordinate system.

Although this alignment routine enables the computer display co-ordinate system to be mapped to the touch screen co-ordinate system, executing such an alignment routine is inconvenient and can be annoying especially in touch systems where a stand alone projector is used to project the computer-generated image on the touch surface. In such a touch system, if the projector and touch screen become even slightly displaced relative to one another, the user must interrupt what they are doing and go through the alignment routine in order to re-map the computer display co-ordinate system to the touch screen co-ordinate system. As will be appreciated, improvements in touch systems to deal with alignment of computer display co-ordinate systems to touch screen co-ordinate systems are desired.

It is therefore an object of the present invention to provide a novel auto-aligning touch system and method of automatically aligning a touch system.

SUMMARY OF THE INVENTION

According to one aspect of the present invention there is provided in a touch system having a touch screen with a touch surface on which an image is displayed, a method of automatically mapping a touch screen co-ordinate system to the display co-ordinate system comprising the steps of:

including in said displayed image at least one reference mark, the location of the at least one reference mark in said display co-ordinate system being known;

acquiring an image of said touch surface including said displayed image;

determining the location of said at least one reference mark in said acquired image relative to said touch screen co-ordinate system; and automatically mapping said touch screen co-ordinate system to said display co-ordinate system using said determined location and the location of the at least one reference mark in said display co-ordinate system.

In a preferred embodiment, the at least one reference mark is an inherent computer operating system display element such as an icon or tool bar portion. In the preferred embodiment, it is also preferred that the displayed image includes a plurality of reference marks, the location of each reference mark in the display co-ordinate system being known.

According to another aspect of the present invention there is provided a touch system comprising:

a touch screen having a touch surface on which an image is displayed;

at least one camera acquiring images of said touch surface including said displayed image;

a pointer contact data generator generating pointer position data in response to pointer contact with said touch surface, said pointer position data representing the location of said pointer on said touch surface where pointer contact is made; and a processor communicating with said at least one camera and said pointer contact data generator, said processor using known points in said displayed images to calibrate automatically co-ordinate systems of said touch system, and using calibrated pointer position data to update image data that is used to present the displayed image on said touch surface.

According to yet another aspect of the present invention there is provided a method of updating image data used to present a displayed image on a touch surface in response to pointer contact on said touch surface, said method comprising the steps of:

displaying an image on said touch surface;

acquiring images of said touch surface including said displayed image;

generating pointer contact data in response to pointer contact with said touch surface;

automatically mapping the touch surface and display co-ordinate systems using known elements in said displayed images and said touch system co-ordinate system; and updating image data used to present the displayed image on said touch surface using pointer contact data that has been calibrated using said mapping.

The present invention provides advantages in that since displacement between known points in the displayed image and the known co-ordinate system of the touch screen can be determined from captured image data, the image co-ordinate system can be mapped to the touch screen co-ordinate system automatically and in real-time, without requiring user intervention.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

The present invention relates generally to a touch system and method that uses an acquired image of a touch surface on which an image having at least one known reference mark is presented, to calibrate automatically the touch system by mapping the touch screen co-ordinate system to the display co-ordinate system. As a result, the touch system can be calibrated in real-time as pointer contacts are made on the touch surface of the touch screen thereby to maintain high resolution and avoid the need to execute an alignment routine requiring manual intervention. The present invention is suitable for use in basically any application where a displayed image needs to be aligned with a touch surface such as for example, electronic whiteboards, touch liquid crystal display (LCD) panels, personal digital assistants (PDAs) and portable touch systems. Preferred embodiments of the present invention will now be described.

Figure 1:
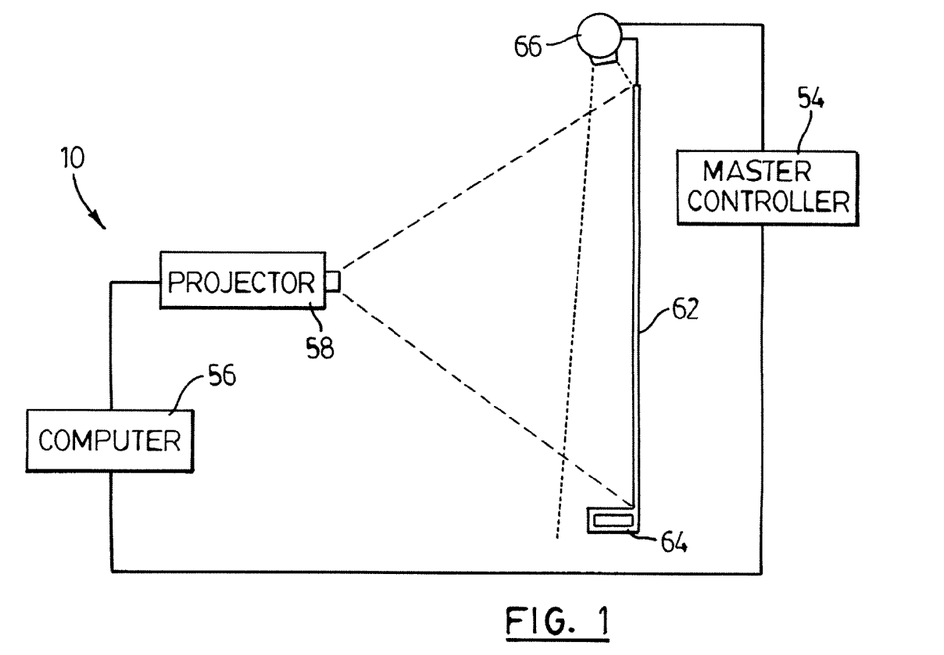
FIG. 1 is a side elevation view of a camera-based touch system in accordance with the present invention.
Figure 2:
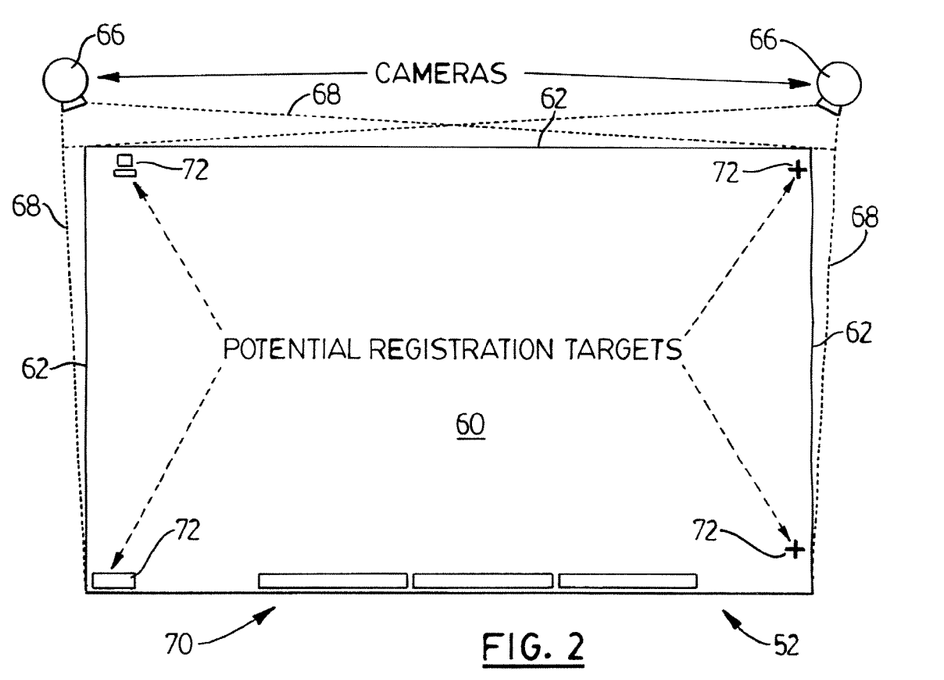
FIG. 2 is a front elevation view of a touch screen forming part of the camera-based touch system of FIG. 1.

Turning now to FIGS. 1 and 2, a camera-based touch system in accordance with the present invention is shown and is generally identified by reference numeral 50. As can be seen, touch system 50 includes a touch screen 52 having a touch surface 60 on which a computer-generated image is presented. Touch surface 60 in this embodiment is a planar rectangular sheet of material bordered by edges 62. A pointer tray 64 is provided along the bottom edge of touch surface 60 and holds pointers used to contact the touch surface 60. A pair of cameras 66 is associated with the touch surface 60. The cameras 66 in this particular embodiment are located adjacent opposite upper corners of the touch surface 60 and are aimed so that their fields of view look generally along the plane of the touch surface 60. The cameras 66 have overlapping fields of view (FOV), shown by the dotted lines 68, that encompass the entire touch surface 60.

The cameras 66 are preferably digital cameras including two-dimensional CMOS image sensors and associated lens assemblies. The CMOS image sensors are configured for 20×640 pixel subarrays that can be operated to capture image frames at high frame rates (i.e. in excess of 200 frames per second) since arbritary pixel rows can be selected.

The cameras 66 acquire images of the touch surface 60 within their fields of view and process the acquired images to determine if a pointer is in the acquired images. If a pointer is in the acquired images, the image data is further processed to determine characteristics of the pointer contacting or hovering above the touch surface 60. Pointer information packets (PIPs) including pointer characteristics, status and/or diagnostic information are then generated by the cameras 66 and conveyed to a digital signal processor (DSP) based master controller 54 together with the raw image data, the purpose for which will be described herein. The master controller 54 processes the PIPs generated by the cameras 66 to determine the location of a pointer relative to the touch surface 60 using triangulation, and generates corresponding pointer position data.

The master controller 54 outputs the generated pointer position data to a computer 56. The computer 56 executes one or more application programs and outputs computer-generated image data that is used by a projector 58 to present a computer-generated image on the touch surface 60. The touch screen 52, master controller 54, computer 56 and projector 58 form a closed-loop so that pointer contacts on the touch surface 60 can be recorded as writing or drawing or used to control execution of application programs executed by the computer 56. The computer-generated image data that is output by the computer 56 is also updated to reflect the pointer activity.

Specifics of the manner by which the image data is acquired by the cameras 66 and processed by the cameras, master controller 54 and computer 56 are described in International PCT Application No. PCT/CA01/00980 filed on Jul. 5, 2001 and published under No. WO 02/03316 on Jan. 10, 2002, assigned to SMART Technologies Inc., the content of which is incorporated herein by reference. Accordingly, such specifics will not be discussed further herein.

In order to calibrate the touch system 50, the touch system 50 performs an auto-calibration procedure to map the computer display co-ordinate system to the touch screen co-ordinate system as images are acquired by the cameras 66 and processed. The auto-calibration procedure is based on the principal that the computer display co-ordinate system is known and that in order to calibrate the touch system 50, it is only necessary to determine the location of a reference mark on the touch screen 52 so that the determined reference mark location can be mapped to the known computer display co-ordinate system.

FIG. 2 shows a computer-generated image 70 displayed on the touch surface 60 of the touch screen 52. As can be seen, the computer-generated image 70 includes reference marks 72 that are used to map the computer display co-ordinate system to the touch screen co-ordinate system. In this particular embodiment, the reference marks 72 include crosses presented at the top and bottom right-hand corners of the computer-generated image 70 as well as computer operating system display elements presented at the top and bottom left-hand corners of the computer-generated image 70. In this example, the computer operating system display elements include a portion of the Windows® toolbar, namely the start button, and the My Computer icon. The crosses are generated by software executed by the computer 56 and inserted into the computer-generated image data.

In order to recognize reference marks in the computer-generated image, the computer 56 stores a pattern library or database of reference mark images that is extensive to account for potential reference mark displacement and rotation. The reference mark images are stored using wavelet compression to enable high-speed access and processing. Wavelet image compression storage for pattern libraries and retrieval is known in the art and described in "A Primer on Wavelets and their Scientific Applications" authored by James S. Walter and published by Chapma & Hall/CRC, 1999, pages 89 to 92.

As mentioned previously, as images of the touch surface 60 and computer-generated image 70 are acquired by the cameras 66, the cameras process the image data to determine if a pointer exists therein. If a pointer exists in the image data, pointer characteristics data is generated by the cameras 66 and conveyed to the master controller 54 together with raw image data. The master controller 54 in turn processes the pointer characteristic data to determine the location of the pointer relative to the touch screen co-ordinate system and outputs pointer position data to the computer 56 together with the raw image data.

In response to the raw image data, the computer 56 performs auto-aligning. During this process, the computer 56 accesses the pattern library and using pattern recognition compares the raw image data with the stored reference mark images in order to recognize the reference marks 72 in the captured images. Once the reference marks have been recognized, the computer 56 calculates the positions of the reference marks 72 on the touch screen 52 using triangulation allowing the positions of the reference marks 72 in the touch screen co-ordinate system to be determined. Since the positions of the reference marks 72 in the computer display co-ordinate system are known, the calculated positions of the reference marks in the touch screen co-ordinate system can be mapped to the known computer display co-ordinate system.

For ease of reference consider the following example. A reference mark is known to be centred on location $X_{cdcs}$, $Y_{cdcs}$ in the computer display co-ordinate system. When the reference mark is displayed and captured in images acquired by cameras 66, its position on the touch surface 60 is calculated to be at location $X_{ts}$, $Y_{ts}$. Therefore when a pointer contacts the touch screen 52 at location $X_{ts}$, $Y_{ts}$, that pointer touch location corresponds to computer display co-ordinate system location $X_{cdcs}$, $Y_{cdcs}$.

By performing this auto-aligning procedure for a number of reference marks 72, the entire touch screen 52 can be accurately mapped to the computer display co-ordinate system.

With the co-ordinates of the reference marks 72 in the computer display co-ordinate system known and with the touch screen co-ordinates of the reference marks 72 calculated, the computer 56 automatically maps the touch screen co-ordinate system to the computer display co-ordinate system. With the touch screen co-ordinate system mapped to the computer display co-ordinate system, the pointer position data conveyed to the computer 56 by the master controller 54 is calibrated in real time. As mentioned previously, the calibrated pointer position data can be recorded as writing or drawing or used to control execution of application programs executed by the computer 56.

Although the touch system 50 is described as processing the camera image data using triangulation to determine the location of the reference marks 72 in the captured images relative to the touch screen co-ordinate system, those of skill in the art will appreciate that other methods of determining the location of the reference marks 72 in the captured images may be used. For example, stereology is a common image processing technique used to measure distances in image planes and may be employed in the present touch system to calculate the positions of the reference marks 72 in the captured images relative to the touch screen co-ordinate system.

As will be appreciated, as images are captured by the cameras 66, the touch screen co-ordinate system and the computer display co-ordinate system are automatically mapped based on reference marks 72 included in the images presented on the touch surface 60. This provides for real-time automatic calibration of the touch system and provides relief from manual calibration requirements.

Figure 3:
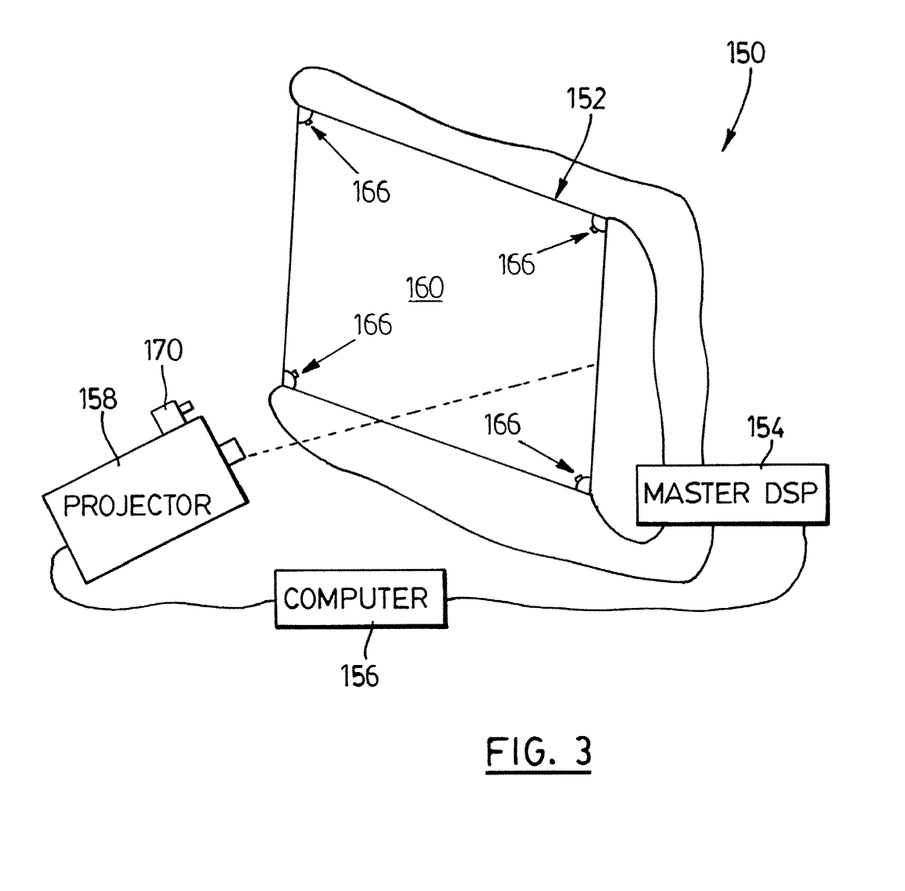
FIG. 3 is schematic illustration of an alternative embodiment of a camera-based touch system in accordance with the present invention.
Figure 4:
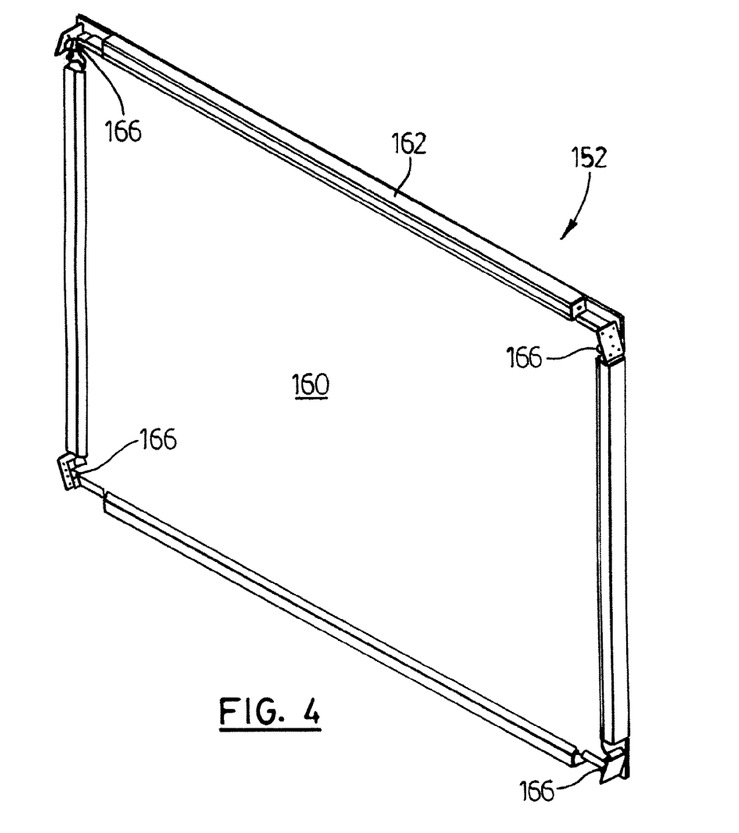
FIG. 4 is a perspective view of a touch screen forming part of the camera-based touch system of FIG. 3.
Figure 5:
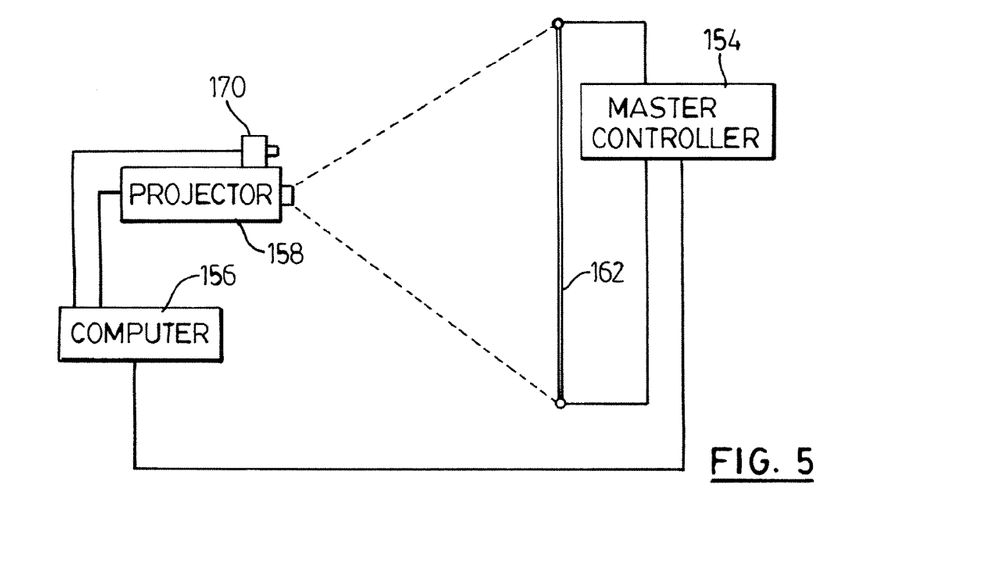
FIG. 5 is a side elevation view of the touch system of FIG. 3.

Referring now to FIGS. 3 to 5, an alternative embodiment of a touch system in accordance with the present invention is shown and is generally identified by reference numeral 150. In this embodiment, like reference numerals will be used to indicate like components with a "100" added for clarity. Camera-based touch system 150 is very similar to that disclosed in previously referenced International PCT Application Serial No. WO 02/03316, assigned to SMART Technologies Inc., assignee of the present invention.

As can be seen, touch system 150 includes a touch screen 152 coupled to a DSP-based master controller 154. Master controller 154 is also coupled to a computer 156. Computer 156 executes one or more application programs and provides computer-generated image output to a projector 158. Projector 158 in turn presents computer-generated images on the surface 160 of the touch screen 152. The touch screen 152, master controller 154, computer 156 and projector 158 form a closed-loop so that pointer contacts on the touch screen 152 can be recorded as writing or drawing or used to control execution of application programs executed by the computer 156.

Unlike the previous embodiment, the touch surface 160 is bordered by a bezel or frame 162 such as that disclosed in U.S. patent application Ser. No. (Not available) filed on Jan. 30, 2003, assigned to SMART Technologies, Inc. assignee of the present invention. DSP-based digital cameras 166 are provided at each corner of the bezel 162. Each digital camera 166 is mounted so that its field of view encompasses and looks generally across the entire touch surface 160.

A high resolution camera 170 is positioned in front of the touch surface 160 above the projector 158 and acquires images of the touch screen 152 including both the touch surface 160 and the bezel 162. Image data acquired by the camera 170 is conveyed to the computer 156 and is used to map automatically the touch screen co-ordinate system to the computer display co-ordinate system thereby to calibrate the touch system 152 as will be described.

With respect to the operation of the touch system 150 as regards image acquisition by the digital cameras 166 to determine if a pointer is in the acquired images, the operation of the touch system 150 is the same as that described in International PCT Application Serial No. WO 02/03316 and therefore, will not be discussed further therein.

With respect to aligning the touch screen co-ordinate system and the computer display co-ordinate system, rather than using raw camera image data to calculate the position of the reference marks on the touch surface using triangulation as in the first embodiment, in this embodiment, the distances between opposite sides of the bezel 162 in raw camera pixels are measured and are then translated to physical distances. Since the bezel is part of the touch system 150, the co-ordinates of the bezel in the touch screen co-ordinate system are known. This allows the distance between a displayed mark and the bezel 162 to be measured in raw camera pixels. Thus, when a pointer approaches the touch surface 160 and is captured in images acquired by the digital cameras 166, the distance between the pointer location and the bezel 162 can be immediately calculated by the computer 156, since the touch screen co-ordinates and pointer co-ordinates are known. Using this information, the offset between any displayed mark on the touch surface 160 and the bezel 162 can be calculated due to the established relationship between raw camera pixels and physical distances.

For example, when the camera 170 captures an image of the touch screen and conveys the image data to the computer 156, the computer determines the lower left bezel corner to be at pixel $X1_{lb}$, $Y1_{lb}$ and the lower right bezel corner to be at pixel $X2_{rb}$, $Y2_{rb}$. The distance between the bezel corners is known to be 50 inches. The camera 170 also sees a displayed mark centered on pixel $X3_{ts}$, $Y3_{ts}$. The computer 156 knows the touch screen co-ordinates for pixels $X1_{lb}$, $Y1_{lb}$ and $X2_{rb}$, $Y2_{rb}$ since they are the bezel locations. As a result the computer 156 is able to calculate the touch screen co-ordinates of the displayed mark by mapping the raw camera pixel co-ordinates of the bezel corner locations to the touch screen co-ordinates of the bezel corner locations. The touch screen co-ordinates of the displayed marks can then be calculated.

If a low resolution camera 170 is used, a zoom lens can be used to look at a portion of the touch screen allowing the offset between the bezel 162 and the displayed mark to be measured. Alternatively, a pair of cameras and stereology techniques can be used to measure the distances.

Figure 6:
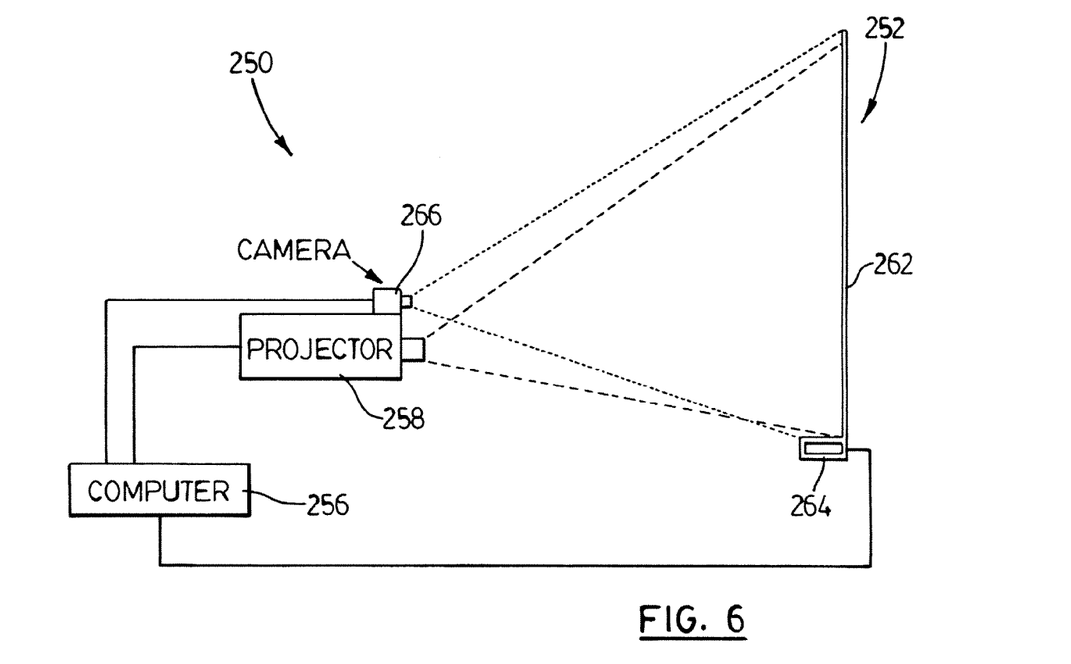
FIG. 6 is a side elevation view of yet another embodiment of a touch system in accordance with the present invention.
Figure 7:
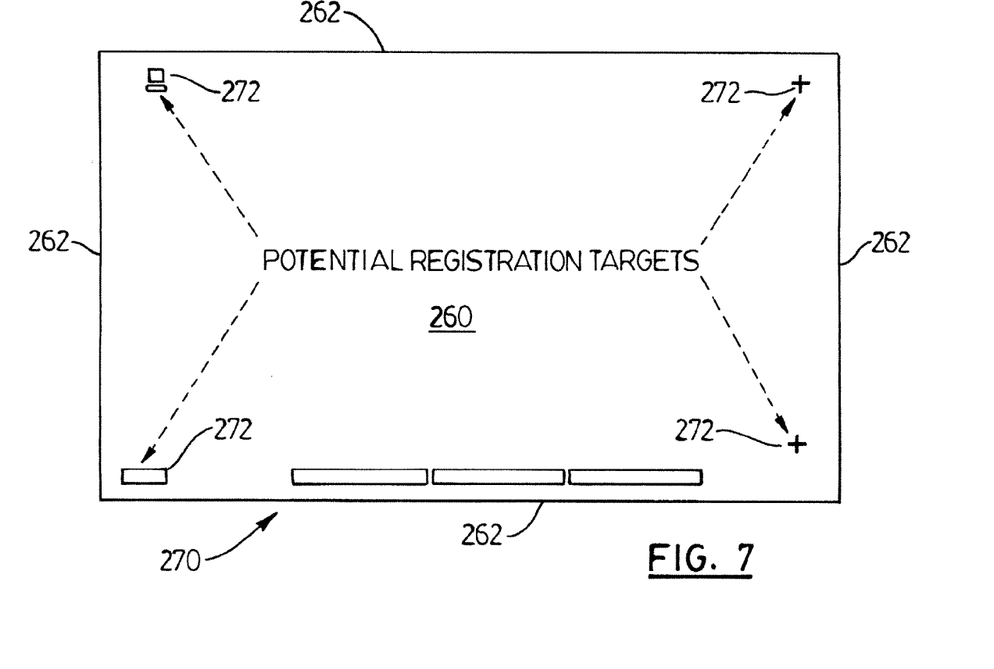
FIG. 7 is a front elevation view of a touch screen forming part of the touch system of FIG. 6.

Turning now to FIGS. 6 and 7, yet another embodiment of a touch system in accordance with the present invention is shown and is generally identified by reference numeral 250. Touch system 250 in this particular example is similar to that shown in U.S. Pat. No. 5,448,263 to Martin, assigned to SMART Technologies Inc., assignee of the present invention. Touch system 250 includes an active overlay disposed over a display surface. Active overlay in this case is an analog resistive touch sensitive screen 252 having a touch surface 260 on which a computer-generated image is presented, bordered by a bezel 262. A pointer tray 264 is provided along the bottom edge of touch surface 260 and holds pointers used to contact the touch surface 160.

When a pointer contact is made on the touch surface 260, the touch sensitive screen 252 generates pointer position data output representing the locations on the touch surface where pointer contacts are made. The pointer position data that is output by the touch sensitive screen 252 is conveyed to a computer 256. The computer 256 executes one or more application programs and outputs computer-generated image data that is used by a projector 258 to present a computer-generated image on the touch surface 260. Similar to the previous embodiment, the computer-generated image 270 displayed on the touch surface includes reference marks 272 as shown in FIG. 7. The touch screen 252, computer 256 and projector 258 form a closed-loop so that pointer contacts with the touch surface 260 can be recorded as writing or drawing or used to control execution of application programs executed by the computer 256. The computer-generated image data output by the computer 256 is also updated to reflect the pointer activity.

A high resolution camera 266 is positioned in front of the touch surface 260 above the projector 258 and acquires images of the touch screen 252 including both the touch surface 260 and the bezel 262. Image data acquired by the camera 266 is conveyed to the computer 256 and is used to map automatically the co-ordinate system of the touch screen 252 to the computer co-ordinate system thereby to calibrate the touch system 250.

During calibration, when the computer 256 receives pointer position data output by the touch screen 252 in response to pointer contacts on the touch surface 260, the computer 256 acquires an image from the camera 266. As in the first embodiment, the computer 256 compares the acquired camera image with the reference mark images in the pattern library to locate the position of the reference marks in the acquired camera image. The computer 256 then calculates the distances between reference marks 272 and the bezel 262 in the manner described previously.

With the co-ordinates of the reference marks 272 in the computer display co-ordinate system known and with the displacement of the reference marks 272 relative to bezel 262 and hence, to a known touch screen co-ordinate system calculated, the computer 256 automatically maps the touch screen co-ordinate system to the computer display co-ordinate system. With the touch screen co-ordinate system mapped to the computer display co-ordinate system, the pointer position data conveyed to the computer 256 by the touch screen 252 is calibrated before being processed and used to update the computer-generated image data.

Although the touch system 250 is shown as a front projection system, those of skill in the art will appreciate that the touch system may be of the rear projection type. Regardless of whether the touch system is of the front or rear projection type, the computer-generated images may be projected onto the touch surface either directly or indirectly via one or more mirrors.

To enhance resolution, a zoom or telephoto lens may be used with the camera 266 to increase captured image detail and thereby provide for more accurate calculation of the displacement between reference marks 272 and the bezel 262. This of course provides for higher resolution when mapping the touch screen co-ordinate system to the computer display co-ordinate system.

Although the reference marks shown in the computer-generated images are located at the four corners of the computer-generated images, those of skill in the art will appreciate that the reference marks may be located at alternative positions within the computer-generated images. More or fewer reference marks may also be used. Furthermore, although the reference marks are shown as including both software generated reference marks and inherent computer operating system display elements, either type of reference mark is suitable.

As will be appreciated by those of skill in the art, processing of the pointer position data and/or image data may be carried out by a stand alone computer coupled to the touch screen or by a processing unit integrated into the touch screen.

Although preferred embodiments of the present invention have been described, those of skill in the art will appreciate that variations and modifications may be made without departing from the spirit and scope thereof as defined by the appended claims.

What is claimed is:

1. In a touch system having a touch screen with a touch surface on which an image is displayed, a method of automatically mapping the touch screen co-ordinate system to the display co-ordinate system comprising the steps of:
   including in said displayed image at least one reference mark, the location of the at least one reference mark in said display co-ordinate system being known;
   acquiring an image of said touch surface including said displayed image;
   recognizing the at least one reference mark in said acquired image by comparing the acquired image with reference marks stored in a reference mark library;
   determining the location of said recognized at least one reference mark in said acquired image relative to said touch screen co-ordinate system; and
   automatically mapping said touch screen co-ordinate system to said display co-ordinate system using said determined location and the location of the at least one reference mark in said display co-ordinate system.

2. The method of claim 1 wherein said at least one reference mark is an inherent computer operating system display element.

3. The method of claim 2 wherein said inherent computer operating system display element is an icon or tool bar portion.

4. The method of claim 1 wherein said displayed image includes a plurality of reference marks, the location of each reference mark in said display co-ordinate system being known.

5. The method of claim 4 wherein at least one of said reference marks is an inherent computer operating system display element.

6. The method of claim 4 wherein reference marks are included adjacent each corner of said displayed image.

7. The method of claim 4 wherein the locations of said reference marks in said touch screen co-ordinate system are determined through triangulation.

8. The method of claim 4 wherein the locations of said reference marks in said touch screen co-ordinate system are determined by calculating the distances between a known edge of said touch surface and said reference marks in raw camera pixels.

9. The method of claim 1 wherein the location of said at least one reference mark in said touch screen co-ordinate system is determined through triangulation.

10. A touch system according to claim 1 wherein said at least one reference mark is a display element of a graphical user interface displayed on said touch screen.

11. A touch system according to claim 10 wherein the reference mark data in said library enables a displaced and/or rotated at least one reference mark to be recognized.

12. A touch system according to claim 11 wherein said reference mark data is wavelet compressed.

13. A touch system according to claim 11 wherein said at least one reference mark is a display element of a graphical user interface displayed on said touch screen.

14. A touch system comprising:
    a touch screen having a touch surface on which an image is displayed;
    at least one camera acquiring images of said touch surface including said displayed image;
    a pointer contact data generator generating pointer position data in response to pointer contact with said touch surface, said pointer position data representing the location of said pointer on said touch surface where pointer contact is made; and
    a processor communicating with said at least one camera and said pointer contact data generator, said processor using reference marks in said displayed image to calibrate automatically co-ordinate systems of said touch system by mapping an existing co-ordinate system of said touch screen to the displayed image co-ordinate system, and using calibrated pointer position data to update image data that is used to present the displayed image on said touch surface, wherein said processor compares the acquired images of said touch surface with a library of reference mark data to identify the reference marks in said acquired images, calculates the locations of said identified reference marks in the touch screen co-ordinate system using triangulation and uses the calculated locations to map the touch screen co-ordinate system to the displayed image co-ordinate system, said mapping being used to calibrate the pointer position data prior to updating said image data.

15. A touch system according to claim 14 wherein said known points include reference marks included in said displayed image.

16. A touch system according to claim 15 wherein at least one of said reference marks is an inherent computer operating system display element.

17. A touch system according to claim 16 wherein said inherent computer operating display element is an icon or a tool bar portion.

18. A touch system according to claim 15 wherein said processor calculates the distances between a known edge of said touch surface and said reference marks in raw camera pixels to determine the locations of the reference marks in the touch screen co-ordinate system.

19. A touch system according to claim 18 further including a projector receiving said image data from said processor and projecting said displayed image on said touch surface.

20. A touch system according to claim 19 wherein at least one of said reference marks is an inherent computer operating system display element.

21. A touch system according to claim 20 wherein said inherent computer operating display element is an icon or a tool bar portion.

22. A touch system according to claim 14 wherein said touch surface and said pointer contact data generator form part of an active touch sensitive screen that generates pointer position data in response to pointer contacts on said touch surface.

23. A touch system according to claim 22 further including a projector receiving said image data from said processor and projecting said image on said touch surface.

24. A touch system according to claim 23 wherein said at least one camera is positioned adjacent said projector.

25. A touch system according to claim 24 wherein at least one of said reference marks is an inherent computer operating system display element.

26. A touch system according to claim 25 wherein said inherent computer operating display element is an icon or a tool bar portion.

27. A touch system according to claim 14 including at least one pair of cameras having overlapping fields of view encompassing said touch surface, said at least one pair of cameras acquiring images of said touch surface from different locations and generating image data, said pointer contact generator processing image data generated by said at least one pair of cameras to determine the location of said pointer relative to said touch surface when said pointer is captured in images acquired by said at least one pair of cameras and generating said pointer position data.

28. A touch system according to claim 27 further including a projector receiving said image data from said processor and projecting said displayed image on said touch surface.

29. A touch system according to claim 28 wherein at least one of said reference marks is an inherent computer operating system display element.

30. A touch system according to claim 29 wherein said inherent computer operating display element is an icon or a tool bar portion.

31. A method of updating image data used to present a displayed image on a touch surface in response to pointer contact on said touch surface, said method comprising:
  displaying a desktop image on said touch surface, at least one display element of said desktop image representing a reference mark;
  acquiring images of said touch surface including said displayed image;
  identifying said at least one reference mark in acquired images by comparing said acquired images with a library of reference marks and determining the location of said at least one reference mark;
  generating pointer contact data in response to pointer contact with said touch surface;
  automatically mapping touch surface and display co-ordinate systems using the determined location of said at least one reference mark on an on-going basis to calibrate the touch surface in real-time; and
  updating image data used to present the displayed image on said touch surface using pointer contact data that has been calibrated using said mapping.

32. The method of claim 31 wherein reference marks are positioned adjacent corners of said displayed image.

33. A touch system comprising:
  a touch screen having a touch surface on which an image is displayed;
  at least one camera acquiring images of said touch surface including said displayed image;
  a pointer contact data generator generating pointer position data in response to pointer contact with said touch surface, said pointer position data representing the location of said pointer on said touch surface where pointer contact is made; and
  a processor communicating with said at least one camera and said pointer contact data generator, said processor using reference marks in said displayed image to calibrate automatically co-ordinate systems of said touch system, and using calibrated pointer position data to update image data that is used to present the displayed image on said touch surface, wherein said processor calculates the distances between a known edge of said touch surface and said reference marks in raw camera pixels to determine the locations of the reference marks in the touch screen co-ordinate system.

34. A touch system according to claim 33 further including a projector receiving said image data from said processor and projecting said displayed image on said touch surface.

35. A touch system according to claim 34 wherein at least one of said reference marks is an inherent computer operating system display element.

36. A touch system according to claim 35 wherein said inherent computer operating display element is an icon or a tool bar portion.

37. In a touch system having a touch screen with a touch surface on which an image is displayed, a method of automatically mapping a touch screen co-ordinate system to the display co-ordinate system comprising the steps of:
  including in said displayed image a plurality of reference marks, the location of the reference marks in said display co-ordinate system being known;
  acquiring an image of said touch surface including said displayed image;
  determining the locations of said reference marks in said acquired image relative to said touch screen co-ordinate system by calculating the distances between a known edge of said touch surface and said reference marks in raw camera pixels; and
  automatically mapping said touch screen co-ordinate system to said display co-ordinate system using said determined locations and the locations of the reference marks in said display co-ordinate system.

38. A touch system comprising:
  a touch screen having a touch surface on which a desktop image is displayed, at least one display element of said desktop image representing a reference mark;
  at least one camera acquiring images of said touch surface including said displayed image;
  a pointer contact data generator generating pointer position data in response to pointer contact with said touch surface, said pointer position data representing the location of said pointer on said touch surface where pointer contact is made; and
  a processor communicating with said at least one camera and said pointer contact data generator, said processor automatically calibrating co-ordinate systems of said touch system generally continually during operation of said touch system by comparing each acquired image with a database of reference marks to identify and locate the at least one reference mark in each acquired image and using the at least one reference mark location to map the touch screen coordinate system to the display coordinate system, said processor using calibrated pointer position data to update image data that is used to present the displayed image on said touch surface.

* * * * *